L. J. IRELAND

July 18, 1933. PROCESS OF RECLAMATION OF CRANK CASE OR USED OILS Re. 18,898

Original Filed Aug. 25, 1930 2 Sheets-Sheet 1

INVENTOR
LEWIS J. IRELAND.
By A. R. Jackson
ATTORNEY

L. J. IRELAND

PROCESS OF RECLAMATION OF CRANK CASE OR USED OILS

July 18, 1933.

Re. 18,898

Original Filed Aug. 25, 1930 2 Sheets-Sheet 2

INVENTOR

LEWIS J. IRELAND.

BY

A. D. Jackson

ATTORNEY

Reissued July 18, 1933 Re. 18,898

UNITED STATES PATENT OFFICE

LEWIS J. IRELAND, OF AUSTIN, TEXAS, ASSIGNOR, BY DIRECT AND MESNE ASSIGNMENTS, TO TRIPLOIL MANUFACTURING COMPANY, OF WILMINGTON, DELAWARE, A CORPORATION OF DELAWARE

PROCESS OF RECLAMATION OF CRANK CASE OR USED OILS

Original No. 1,851,432, dated March 29, 1932, Serial No. 477,582, filed August 25, 1930. Application for reissue filed November 14, 1932. Serial No. 642,687.

This invention relates to the process of reclamation or reconditioning used petroleum oils and it has particular reference to certain advanced steps in a process for rejuvenating lubricating oils which have become temporarily impaired through constant use and through contamination by foreign substances in the crank case of a motor vehicle.

The principal object of the invention resides in certain new and novel steps by which is effected the removal of diluents, such as gas and water laden molecules, dust, carbon, motor grindings and similar foreign substances whose presence in the oil renders it ineffective for further use as a lubricant.

Rapid deterioration of lubricating oils, especially those used in internal combustion motors, is a result either from leaky piston rings, contamination with dirt and other abrasive foreign substances. Moreover, in many cases faulty fractionation will result in rapid dilution in the case of the cheaper grades of oil, due to the presence of highly volatile constituents. This condition can be overcome by the use of the present invention by the removal of such diluent portions of the oil, to eliminate the non-lubricating solids or abrasive foreign substances, due to the presence of dust and similar matter accumulating in the crank case.

The invention seeks to provide a method by which to effect absolute restoration of this lubricating medium to its original specification.

Figure 1:
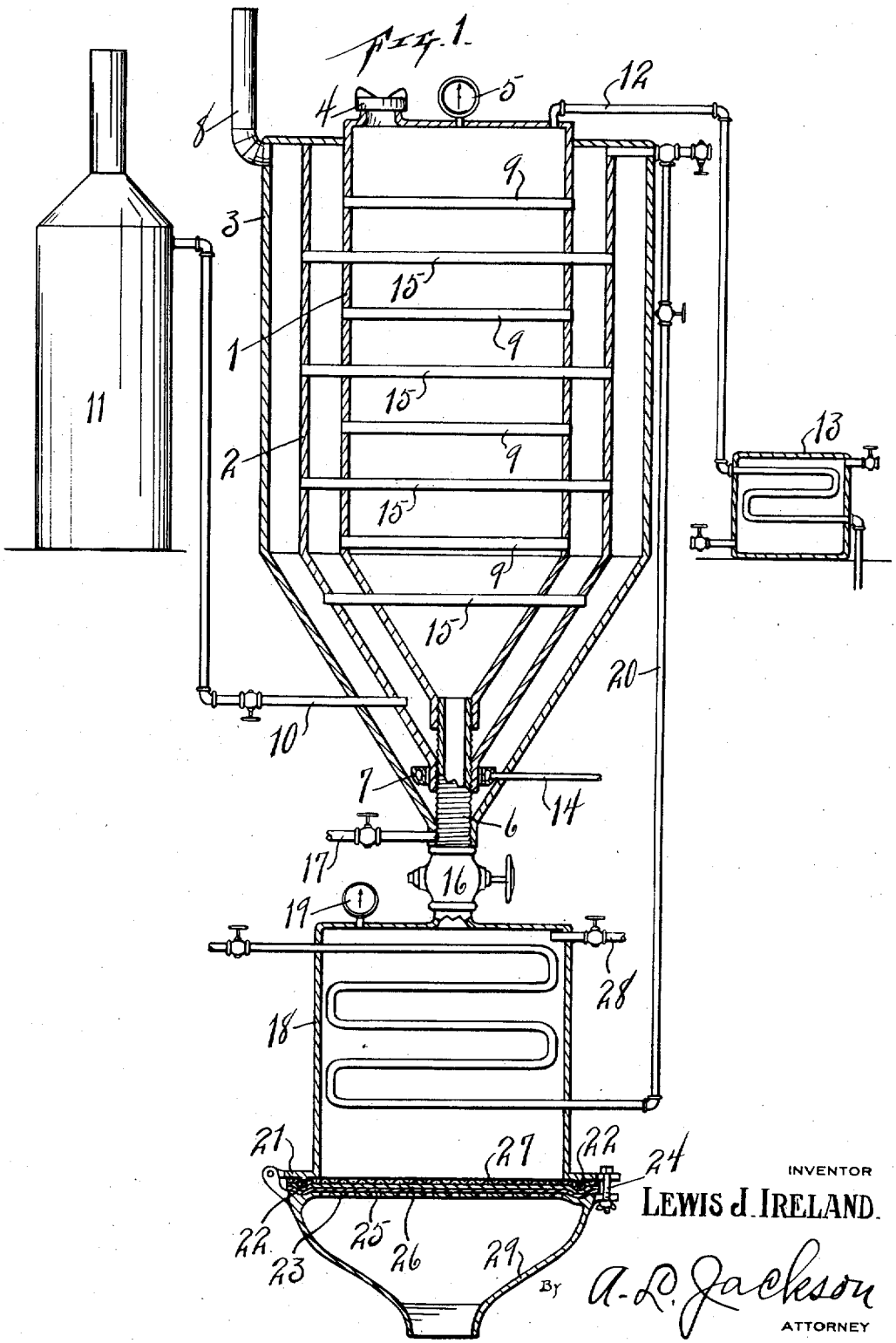
Figure 2:
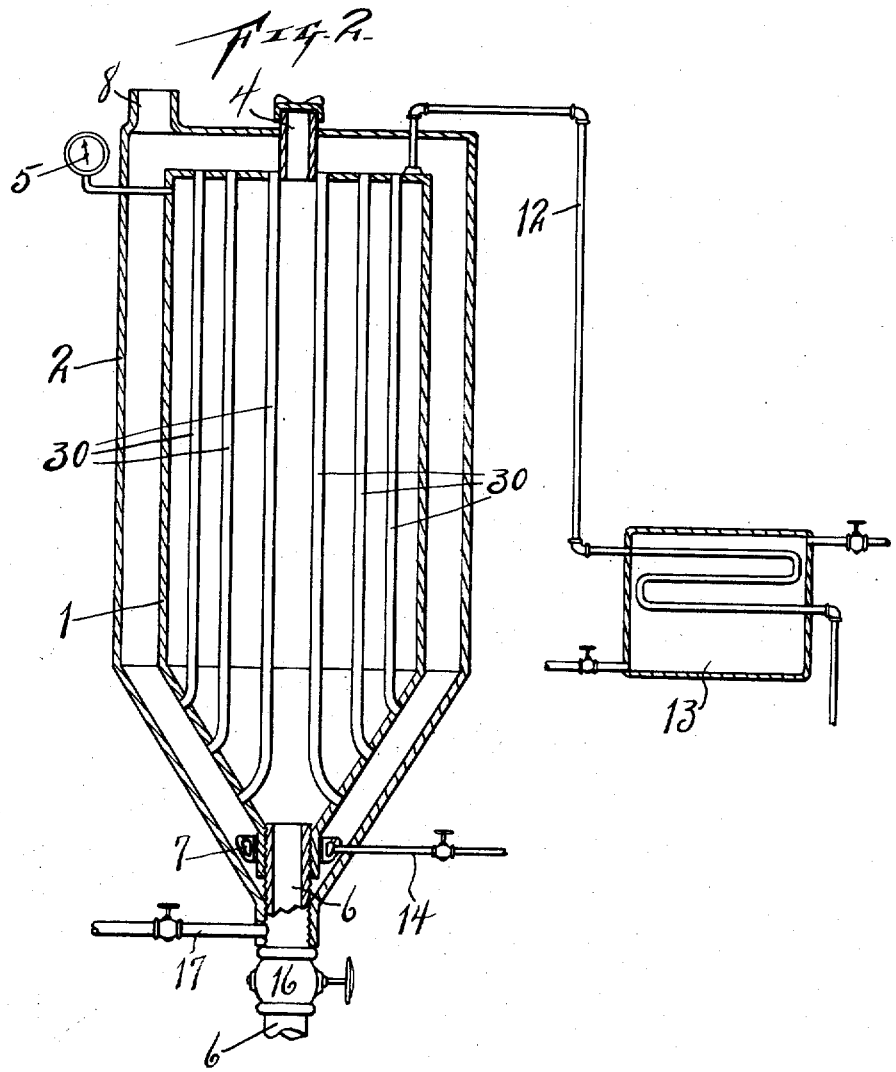

With the foregoing objects as paramount, the invention has particular reference to its salient features of construction and arrangement of parts which will become manifest as the description proceeds, taken in connection with the accompanying drawings wherein:

Figure 1 is a vertical section of the apparatus by which the several steps of the method are carried out, showing a tank and concentric arrangement of jackets, and Figure 2 is a vertical section of a modified form of tank with the steam jacket omitted.

Continuing with a more detailed explanation of the drawings, 1 designates a cylindrical tank constructed so as to define a substantially funnel shaped lower portion. A steam heating jacket 2 and a fuel heating jacket 3 surround the tank 1 in concentric relationship.

In continuing further, it is pointed out that two forms of apparatus are illustrated. While there is but slight difference in the construction and operation of the two modified forms of apparatus, the type illustrated in Figure 2 is peferred, it being understood that the filter, which will be described in detail presently, is substantially the same on Figure 2 as illustrated in Figure 1.

Certain acid treated clays are mixed with the diluted or contaminated oils placed in the tank 1 and which have the effect of absorbing the impurities, such as dirt, carbon and the like from the oil. The mixture, that is the clay and oil is injected into the tank through the filler opening 4, which has a suitable cover or cap as shown in the drawings. A suitable pressure gauge 5 is provided for the tank and a discharge pipe 6 is disposed at the small end of the funnel shaped lower portion of the tank 1.

It will be noted that the steam heating jacket 2 is likewise funnel shaped so as to embrace the discharge pipe 6 at its lower end. Also surrounding the discharge pipe 6 immediately below the lower end of the jacket 2 is a burner 7 whereby heat may be applied to the exterior of the said jacket 2 and within the jacket 3 and will emerge through the flue 8 communicating with the top of the exterior jacket 3, as shown in Figure 1 especially.

In the construction shown in Figure 1 lateral pipes 9 are projected through the tank 1 so as to effect thorough circulation of heat throughout the contents of the tank. It has been stated that the annular space between the exterior jacket 3 and the intermediate jacket 2 is heated through the medium of the gas or oil burner 7 surrounding the discharge pipe 6. In order to supply heat into the annular space between the jacket 2 and the outer walls of the tank 1, the pipe 10 is provided which is connected to the steam supply tank 11 and introduces steam into the said space and thereby uniformly heats the exterior surface of the walls of the tank 1 and circulates through the tank through pipes 9, which, as apparent in Figure 1, communicate with the space between the tank 1 and the jacket 2. Additional pipes 15 communicate with the space between the intermediate jacket 2 and outer jacket 3. Thus, the heat rises from the burner 7, as well as the heat of the steam injected through the pipe 10, as stated.

Due to the circulation of heat from the two sources explained, a topping operation is carried out, that is to say, the lighter volatile constituents will be converted into vapors which ascend through the pipe 12, to enter a condenser 13 wherein they will be reduced again to liquid form. Further mention of the evaporating steps will be made presently.

In order to supply the burner 7 with fuel, a pipe 14 is provided through which gas or fuel oil may be supplied to the burner, whose heat, as stated previously, will rise about the exterior of the jacket 2 and circulate through the lateral pipes 15.

To insure proper performance of the apparatus, and to expel the vaporized constituents from the tank 1, the contents of the latter must be thoroughly agitated. In this connection, it is preferred that no mechanical means of agitation be employed since it has been found that by passing air under pressure through a pipe 17, communicating with the discharge pipe 6, into the tank 1, thorough agitation of its contents will be effected, thereby minimizing entrainment of gases in the oil, which would be the case should mechanical agitation be employed. To aid in the topping or vaporizing step of the process, the oil is heated to a very high degree and maintained so throughout the operation.

As apparent in Figure 1, the pipe 6 discharges into an air filter 18, which is provided with a pressure gauge 19. The temperature within this filter is maintained at a high degree of heat by the exhaust of steam from the steam jacket 3, which passes through the pipe 20, which communicates with the steam jacket near the top of the apparatus and enters the filter 18, in which it is convoluted before its passage therefrom. Obviously, when the valve 16 in the pipe 6 is actuated to allow the contents of the tank 1 to enter the filter 18, the mixture of oil and clay thus entering the filter will be subjected to the heat radiating from the convoluted portion of the pipe 20, at approximately 453° F., which is a prerequisite for speedy filtration. The valve 16 is not opened until after the topping operation referred to has been completed.

A base flange 21 is provided at the bottom of the filter 18 and which has an annular bead or rib 22 on the underside thereof. A disc 23 is hingedly connected to the flange 21 on one side and is locked diametrically opposite by a bolt 24. The disc 23 is perforated and a layer of paper 25 or other suitable material is placed thereon. A layer of fabric 26 is then placed on the layer of paper 25 and a foraminous screen 27 is placed on top of the fabric. It is pointed out that the oil, the viscosity of which is lowered by the application of heat, filters through laminations of fabric and paper and the perforations in the disc 23.

Filtration of oil through the laminations of fabric and paper is augmented or speeded up by the application of air under pressure through the pipe 28, fragmentarily shown as entering the top of the filter 18 and is connected with any type of conventional air compressor or the like. In thus forcing the oil to filter, it is received within the bowl 29, which is an integral part of the perforated disc or plate 23 and which is provided with an outlet at its bottom, as shown in Figure 1.

After all of the oil has been forced out of the filter 18, the bolt 24 is removed so as to allow the disc 23 to swing downwardly. The layer of paper 25 and the layer of fabric 26, upon which the deposits of clay repose may be removed and a new layer substituted for another operation.

The foregoing description being definitive of both structure and function, it is regarded as sufficient to explain the operation of the machine. Also, the description deals with the structure shown in Figure 1, which is substantially the same as the variation or modified form of the apparatus shown in Figure 2, with the exception of the fact that the heat circulating or distributing pipes 30, shown in Figure 2 are vertically disposed instead of being horizontally disposed as shown in Figure 1. Moreover, the jacket 2 extends above the tank 1 and the filler nozzle 4, must of necessity extend through the upper end of the jacket 2. Otherwise the structure and operation is identical.

Manifestly, the construction shown is capable of some modification and such modification as is considered within the scope and meaning of the appended claims is also considered within the spirit and intent of the invention.

What I claim, is,—

1. The hereindescribed process for reclamation of used lubricating oils which resides in introducing the oils, together with acidulated clay in an amount sufficient to restore the oil to its original specification, in a confined zone and heating the mixture to a temperature to drive off the more volatile non-lubricating oils without cracking the lubricating oil, then in agitating the mixture solely by passing a continuous stream of air therethrough of such predetermined pressure to effect complete agitation and mixture of the oil and clay and to drive off said vapors by said air stream, then as a continuous step drawing off the mixture and filtering the same prior to substantial cooling thereof by super atmospheric air pressure.

2. The hereindescribed process for reclamation of used lubricating oils which resides in introducing the oils, together with acidulated clay in an amount sufficient to restore the oil to its original specification, in a confined zone and heating the mixture to a temperature to drive off the more volatile non-lubricating oils without cracking the lubricating oil, then in agitating the mixture solely by passing a continuous stream of air therethrough of such predetermined pressure to effect complete agitation and mixture of the oil and clay and to drive off said vapors by said air stream, then in drawing off the mixture into a separate zone, and filtering same at a temperature substantially approximating that of said initial temperature by super atmospheric gaseous pressure applied to the surface of the mixture.

3. The hereindescribed process for reclamation of used lubricating oils which resides in introducing the oils and a sufficient amount of acidulated clay to restore the oil to its original specification, in a confined zone and heating the oil to a temperature to drive off the more volatile non lubricating oils without cracking the lubricating oil, in agitating the mixture substantially entirely by passing a continuous stream of gaseous medium therethrough of such predetermined pressure to effect complete agitation and mixture of the oil and clay and to drive off said vapors by said stream of gaseous medium, then as a continuous step drawing off the mixture and filtering the same under super atmospheric gaseous pressure while still retaining a substantial quantity of the heat of the aforesaid heating step.

4. The hereindescribed method for reclamation of used lubricating oils which resides in introducing the oils and acidulated clay in an amount sufficient to restore the oil to its original specification, in a confined zone and heating the mixture to a temperature to drive off the more volatile non lubricating oils without cracking the lubricating oil, in agitating the mixture substantially entirely by passing a continuous stream of gaseous medium therethrough of such a predetermined pressure as to effect complete agitation and mixture of the oil and clay and to drive off said vapors by said stream, drawing off the mixture into a separate zone and filtering the same under super atmospheric gaseous pressure applied to the surface of the mixture while still retaining a substantial quantity of the heat of the aforesaid heating step.

5. The hereindescribed process for reclamation of used lubricating oils which resides in introducing the oils and acidulated clay in an amount sufficient to restore the oil to its original specification, in a confined zone and heating the mixture to a temperature to drive off the more volatile non lubricating oil, agitating the mixture substantially entirely by the introduction of a stream of gaseous medium upwardly through the body of the oil under such a predetermined pressure as to effect complete agitation of the mixture of oil and clay and to drive off said vapors by said stream, withdrawing the mixture after it has been thus treated to a separate zone and there subjecting it to filtration while still retaining a substantial quantity of the heat of the aforesaid heating step.

6. The hereindescribed process for reclamation of used lubricating oils which resides in introducing the oils and acidulated clay in an amount sufficient to restore the oil to its original specification, in a confined zone and heating the mixture to a temperature to drive off the more volatile non lubricating oils to a condensation zone, agitating the mixture substantially entirely by passing a stream of gaseous medium upwardly therethrough while maintaining the pressure of said gaseous medium to an extent sufficient to agitate the mixture of oil and clay and to maintain the clay particles in a state of suspension in the body of the heated oils and to also drive off the vapors to the condensation zone, withdrawing the mixture of oil and clay thus treated to a separate filtration zone and forcing the oil, while still retaining a substantial quantity of the heat of the aforesaid heating step, through said filtration zone.

LEWIS J. IRELAND.